United States Patent Office 3,449,071
Patented June 10, 1969

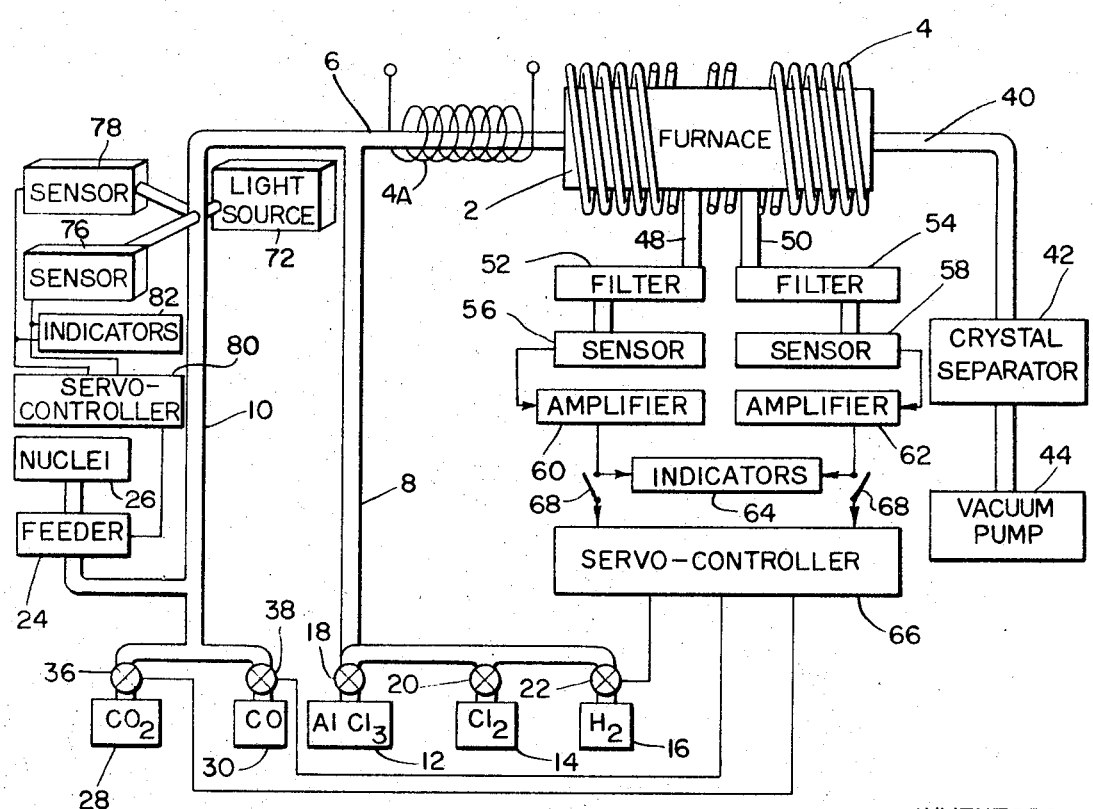

3,449,071
PREPARATION OF ALUMINA CRYSTALS FROM A VAPOR PHASE REACTION BY MONITORING THE SPECTRAL SCATTERING OF LIGHT
William B. Campbell, Belmont, and William D. Kingery, Marion, Mass., assignors to Lexington Laboratories, Inc., Cambridge, Mass., a corporation of Massachusetts
Filed Sept. 28, 1965, Ser. No. 490,935
Int. Cl. C01f 7/20
U.S. Cl. 23—142                     11 Claims

ABSTRACT OF THE DISCLOSURE

The invention is an improvement in processes for growing crystalline bodies by deposition from a vapor phase reaction. It provides a method of determining and controlling product morphology by monitoring scattering of light by particles in the vapor phase and adjusting the reaction conditions according to the degree of scattering.

This invention relates to the growth of crystalline materials from the vapor state and more particlularly to improved process control.

It is well known that certain crystalline materials may be produced by deposition from the vapor phase involving interaction of selected vapor phase reactants at solid-vapor interfaces. By way of example but not limitation, it is possible to synthesize from vapor phase reactions such materials as alpha-alumina (sapphire), chromium doped alpha alumina (ruby), and silicon nitride. Depending upon opearting conditions, particularly pressure, temperature, and degree of supersaturation in the reaction chamber, it is possible for vapor phase reactions to yield powders (usually a mixture of mono- and polycrystalline particles), fine fibers (also called "whiskers"), platelets and relatively large single crystals. However, except perhaps for powders, it has been difficult to achieve growth on a selective basis with any degree of consistency of product form and yield. There are several reasons for this difficulty, including inadequate means for monitoring product formation and maintaining the reaction at the optimum level for the desired morphology. Although limited visual inspection of the product is possible as it deposits within the reaction chamber, it is not a desirable basis for process control. What is desired is a process control system comprising a reliable product monitor that facilitates automatic or operator adjustment of selected parameters, e.g., flow rates of selected reactants, to maintain a steady reaction state in which selected growth occurs.

Accordingly, it is an object of this invention to provide a new system for monitoring a vapor phase reaction to determine product morphology. It is another object of this invention to provide a system for (a) monitoring a vapor phase reaction to determine product morphology and (b) adjusting the reaction conditions so as to consistently achieve a desired morphology.

A further object is to provide an improvement in high temperature vapor phase processes for synthesizing crystalline materials, the improvement comprising a method of detecting particles in a gas stream to determine and control particle concentration, size and/or morphology. More particularly the invention is designed to permit in situ determination of the morphology of alumina and alumina doped particles produced by a vapor phase reaction and to provide continuous adjustment of operating parameters required for selected morphology.

A more specific object of the invention is to achieve process control of a vapor phase reaction by utilizing the light scattering effect resulting from particles in the reaction gas stream to control one or more process parameters.

A further specific object is to achieve improved control of a vapor phase reaction of the type wherein crystal growth occurs on injected nuclei, by providing novel means for monitoring and determining the rate of flow of nuclei into the reaction zone.

Other objects and many of the attendant advantages of the present invention will become more readily apparent from the following detailed specification when considered together with the accompanying drawings, wherein:

FIG. 1 presents curves illustrating how α-alumina particles of different shapes scatter infrared light at different wavelengths; and FIG. 2 illustrates a system for growing sapphire whiskers in accordance with the present invention.

The present invention is based upon the fact that particles of different morphology and size scatter monochromatic light to a different extent and this scattering effect is a function of wavelength. The difference in degree of scattering is sufficient to permit evaluation of particles in a gas stream and, by means of a suitable control system, to regulate selected process parameters affecting the form or size of the particles. In the embodiment of the invention hereinafter described, the scattering effect of alumina particle on infrared light forms the basis of a reaction control system adapted to maximize production of alumina whiskers and minimize simultaneous occurrence of alumina powder.

FIG. 1 presents two curves A and B which are based upon actual experimental measurements. Curve A illustrates the transmissivity of infrared light through an alumina reaction chamber containing a reaction gas stream from which essentially only alumina powders are being formed. Curve B illustrates transmissivity of infrared light through the same reaction zone when essentially only alumina whiskers are formed. The two curves show that the spectral scattering (an inverse function of transmissivity of infrared light is not the same for whiskers and powders. This is to be expected from the differences in particle size and shape. The behavior of fine powders in scattering light is essentially that which is characteristic of spheres, and for the most part appears to be a function of a single dimension, namely the particle diameter. Powders scatter light best when the particle size is near the light wavelength. The range of powder particle size is not wide and tends to be concentrated within relatively close limits for a given rate of reaction. Whiskers, on the other hand, have two dimensions, length and diameter, and their scattering behavior reflects both.

Referring now to curve A in particular, monodispersed alumina powders characteristically show a sharp peak confined to a relatively narrow bandwidth of about 0.2 micron, with a rapid fall-off from the peak to zero percent transmittance with increasing wavelengths. Although not shown by curve A, substantially the same rapid fall-off occurs with decreasing wavelengths. The sharp peak in curve A tends to shift to the left with a decrease in particle size and to the right with an increase in particle size. The general level of curve A tends to shift inversely with the concentration of powder particles in the gas phase. In other words, the greater the rate of powder nucleation and precipitation, the less the percent transmittance.

Referring now to curve B, the differential between the length and diameter of whiskers results in a spectral scattering of light that encompasses a range of wavelengths that is relatively wide in comparison to powders as represented by curve A. Accordingly, curve B lacks the sharp peak of curve A and instead has several rounded peaks characterizing a gentle drop from a maximum level with an increase in wavelength. The fall-off from peak transmittance with decreasing wavelength is relatively sharp and tends to occur in approximately the same wavelength range as powders. The sharp peak in curve A falls within a wavelength range encompassing the maximum level of curve B. Of course, curve B tends to shift to the right or left according to an increase or decrease respectively in particle size, but this effect may be considerably less marked than with curve A since powders are susceptible to larger changes in size on a percent basis. The general level of curve B also will shift with rate of whisker production, but to a less degree since the parameters for whisker growth are more critical than those for powder growth. Since particle size is a function of morphology and concentration level, i.e., rate of production, is a function both of morphology and the thermodynamics of the vapor phase reaction, curves A and B are fairly representative of the spectral scattering characteristics of alumina powders and whiskers over a relatively wide range of operating conditions and their marked differences provide a suitable basis for determining which morphology predominates in the reaction zone and automatically controlling the operating parameters of the vapor phase reaction process to optimize production. In the specific embodiment hereinafter described the desired product form is whiskers; however, the same system could be adjusted to produce powders or bulk crystals at an optimum rate.

The preferred embodiment of the invention hereinafter described achieves vapor phase growth of sapphire whiskers on selected nuclei in accordance with the following reaction equation:

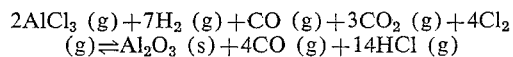

The selected nuclei are fine alumina particles in micron sizes that are delivered to the reaction zone with the gaseous reactants. With the foregoing reaction, as with other similar vapor phase reactions, deposition of products involves the existence of a supersaturated vapor phase. Control of supersaturation is essential in order to achieve control of crystal growth; whiskers occur at a lower level of supersaturation than is required to produce powders or bulk crystals. The degree of supersaturation is determined by the reaction zone temperature, the pressure in the reaction zone, and the gas phase composition. It also has been determined that the amount of nuclei in the reaction zone will affect the degree of supersaturation. In the embodiment hereinafter described the reaction zone temperature and total pressure are held constant and the gas phase composition is controlled in accordance with the output of an optical vapor phase monitor to maintain a desired level of supersaturation calculated to yield optimum production of alumina whiskers. Additional optical means utilizing essentially the same light scattering principles are provided to monitor and control the amount of nuclei entering the reaction zone.

Turning now to FIG. 2, the illustrated system comprises a reaction chamber in the form of a closed alumina furnace 2 which is heated by suitable means such as an electric resistance coil 4. One end of the furnace is connected to an inlet line 6 that is fed by two supply lines 8 and 10. The former leads to a source 12 of alumina chloride gas and separate sources 14 and 16 of chlorine and hydrogen. Manually adjustable solenoid controlled valves 18, 20, and 22 are provided to regulate the flow of aluminum chloride, chlorine and hydrogen. Supply line 10 is connected by a variable feeder 24 to a source 26 of nuclei; it is also connected to separate sources 28 and 30 of carbon dioxide and carbon monoxide. The nuclei consist of α-alumina particles whose size is in the order of microns. The variable feeder 24 and separate manually adjustable solenoid controlled valves 36 and 38 regulate the flow of nuclei, carbon dioxide and carbon monoxide. The term "feeder" is used herein to denote any feasible means for controllably feeding nuclei into the $CO_2$—$CO$ gas stream in line 10 and, for example, may comprise an electrically controllable vibratory feeder. The input from supply line 10 consists of nuclei entrained in the $CO$—$CO_2$ gas mixture. Electrical resistance heating coils such as shown at 4A are provided to preheat the gases before they enter the furnace. At its downstream end the furnace has an outlet line 40 which is connected via a crystal separator 42 to a vacuum pump 44. The latter is adapted to withdraw gases and alumina whiskers from the furnace while maintaining the overall reaction chamber pressure at a desired level. Preferably, the crystal separator 42 is a filter that is adapted to pass the gaseous effluent from the reaction chamber while retaining the fiber-bearing nuclei.

The temperature within the furnace is kept constant at a predetermined level favorable to whisker growth according to the foregoing reaction equation under proper flow and pressure conditions. Thermocouples and associated relays (not shown) are used to determine and control the temperature within the furnace as well as the temperature of the gases entering the reaction chamber. Suitable means (also not shown) are employed to monitor the pressure within the furnace at all times during whisker production and to automatically control operation of the vacuum pump so as to maintain a substantially constant pressure in the reaction zone.

The system of FIG. 2 also includes other elements adapted to provide process control in accordance with the principles of the present invention. These additional elements include two hollow tubes 48 and 50 attached to and communicating with the interior of the alumina furnace. The two tubes are directed into the reaction zone at right angles to the direction of movement of the gas stream. During operation of the furnace its heated interior surface acts as a light source and emits light with a spectral range substantially the same as the range of emission from hot alumina particles. This light is scattered by alumina particles in the gas stream. The two tubes are aimed at substantially the same spot on the opposite interior wall of furnace and the intensity of the light which they see varies inversely with the degree of scattering. As pointed out earlier, the overall level of scattering is a function of the particle density in the gas phase while the relative amount of scattering of different wavelengths is affected by particle forms. The light received by tubes 48 and 50 is channeled thereby to two band-pass filters 52 and 54 respectively; the latter in turn pass light in selected narrow wavelength bands to two infrared sensors 56 and 58. The sensors are conventional infrared type photocells, but other suitable sensors may be used. The output of the sensors are fed to separate electronic amplifiers 60 and 62 and the outputs thereof are applied to suitable indicators 64 which are adapted to indicate the intensity of incident light received by the sensors. The outputs of the amplifiers also are applied to a differential servo-type controller 66 which provides output signals that may be used to control one or more of the solenoid-type control valves 18, 20, 22, 38, and 36 and/or feeder 24. In the illustrated embodiment the servo-controller is connected to control only valves 22, 36, and 38. Suitable switches 68 are provided to disconnect the servo controller when it is desired to manually adjust the settings of the various flow control valves. Servo controllers are well known in the art of electronic controls. For the purposes of the illustrated embodiment of the invention the servo controller is of the type which can respond to the difference in amplitude between the outputs of amplifiers 60 and 62 and provide control signal outputs to open or close valves 22, 36 and 38 to reduce or increase the amplitude difference according to predetermined reference limits.

More specifically, the optical control system just described is keyed to the infrared scattering characteristic illustrated in FIG. 1, the band pass filter 52 being adapted to pass infrared falling within a narrow band of about 1.2 to about 1.3 microns, while the second filter 54 is adapted to pass infrared in a range of about 2.1 to about 2.2 microns. The servo controller is adapted to automatically adjust the settings of valves 22, 36 and 38 in a direction to minimize the difference between the outputs of amplifiers 60 and 62. In this connection it is to be observed that a small difference is indicative of whisker formation while a relatively large signal from amplifier 60 accompanied by a relatively small signal from amplifier 62 is indicative of powder formations. In the event powders and not whiskers are the desired product, the servo-controller would be adjusted to operate valves 22, 36 and 38 in a direction to maximize the output of amplifier 60 and minimize the output of amplifier 62. Growth of bulk crystals is distinguishable from growth of whiskers and powder in that the difference between the amplifier outputs under crystal growth conditions is substantially the same as it is under initial conditions, i.e., after heating of the alumina furnace but prior to introduction of nuclei and reactant gases. While the intensity of light input to both sensors is attenuated somewhat when a gas phase is present in the furnace, the attenuation is essentially the same for both sensor inputs and, therefore, although both amplifier outputs will change when the vapor phase is introduced into the furnace, the difference between the two amplifier outputs will be the same under bulk crystal growth conditions. Accordingly, if bulk crystals are the desired end product, the servo-controller would be adjusted to operate valves 22, 36, and 38 in a direction to maintain a constant difference between the two amplifier outputs during the crystal growth period, with the magnitude of the difference during the run being equal to that which occurs under initial conditions.

An additional control system is provided to regulate the rate of flow of nuclei into the furnace. This additional control system comprises an infrared light source 72 whose output is directed into supply line 10. Two sensors 76 and 78 are mounted in communication with the interior of supply line 10, sensor 76 being positioned directly in line with light source 72, and sensor 78 displaced 90° from both its companion sensor and the light source. Thus, if no nuclei are present in the $CO_2$—CO gas stream, sensor 76 will read the full output of light source 72, subject to intensity loss due to gas absorption. At the same time sensor 78 will read only incident light reflected from the interior wall of supply line 10. When nuclei are present in the gas stream, the outputs of both sensors will change; the intensity of the light seen by sensor 76 will drop due to absorption and scattering by the nuclei and sensor 78 will show an increase in input due to its receiving light scattered 90° by the same nuclei. With such an arrangement, the proportions of the outputs from sensors 76 and 78 are indicative of the particle density, i.e., concentrations in the gas stream. If required, the outputs of both sensors may be amplified, otherwise they are fed directly to a differential servo controller 80 that is connected to control operation of nuclei feeder 24. Suitable indicators 82 are provided to show the relative magnitudes of the two sensor outputs. The servo controller is adapted to determine the difference between the two sensor outputs and to modify the setting of feeder 24 in a direction to keep the signals within predetermined limits representative of a selected particle density. Thus whenever the density of nuclei in the CO—$CO_2$ mixture commences to change, it will be reflected by a difference in the signals read by the sensors 76 and 78, and this difference will cause the servo-controller 80 to restore the output of feeder 24 to its original level. This adjustment of feeder 24 is fed back to the control system in the sense that the outputs of sensors 76 and 78 will assume their original proportions.

Operation of the system of FIG. 2 is explained in the following example illustrating how alpha alumina whiskers are produced according to the present invention.

The furnace 2 is heated and the heating is controlled so that the center section thereof is maintained at a level of about 1560° C. The gas supply lines also are heated with the heating maintained so that the various gases will be at a temperature of 300–400° C. as they enter the furnace. At the same time, the system is pumped down to a vacuum of about 50 microns of mercury. Light source 72 is energized. Then feeder 24 is actuated to supply alumina nuclei having a size in the range of 5–10 microns at a rate of about .01 gram per minute. The servo controller 80 also is actuated and is set to maintain feeder 24 at the selected rate of delivery. Gas flow is initiated when the feeder is started, with hydrogen flow commencing last. The nuclei delivered by feeder 24 are swept up by the $CO_2$—CO gas mixture and delivered to the furnace. Initially the flow rates of the various gases in liters per minute at room temperature are set as follows: aluminum chloride—0.03; hydrogen—0.95; chlorine—0.02; carbon dioxide—0.80; and carbon monoxide—0.22. The initial flow rates of the various gases are set by manual adjustment of the various valves 18, 20, 22, 36 and 38. Thereafter the pressure within the reaction chamber is adjusted to 5.5 mm. of mercury and is maintained at that level during the run. Under the foregoing conditions whiskers begin to grow on the nuclei in the center section of the furnace. At this point the optical control system for monitoring the reaction zone is put into operation, with the exception of the servo controller, so that the indicators 64 will commence to indicate the intensity of infrared light passed by filters 52 and 54. At this point further manual adjustment of the various control valves is possible using the readings of indicators 64 as a guide. In fact, it is possible to continue the process using only manual control of valves 20, 36, and 38 to optimize whisker growth. Instead, however, as soon as the indicators 64 indicate quasi optimum outputs from amplifiers 60 and 62, switches 68 are closed to render the servo-controller an operative part of the system. Thereafter the valves 20, 36 and 38 are automatically controlled by the servo controller to minimize the difference between the outputs of amplifiers 60 and 62; in effect the servo controller causes a change in the concentration of the gases within the furnace in a direction to maintain constant an optimum degree of supersaturation notwithstanding fluctuations in temperature, pressure and rates of delivery of other gases and the nuclei. Whiskers will continue to be produced so long as nuclei and reactant gases are supplied to the reaction chamber. Because of the precise control afforded by the system, little growth occurs on the furnace walls or in the lines leading to and from the furnace. The whisker-bearing nuclei are swept out of the furnace by the effluent gases and are recovered in crystal separator 42. The recovered product consists of rhombohedral, prismatic and/or hexagonal alpha-alumina whiskers having lengths up to ¾ inch and diameters in the order of about 7 microns.

Of course, the system also is applicable to controlled growth of other forms of alumina or to the growth of selected forms of crystals of other materials, e.g., boron, $SiO_2$, $Si_3N_4$, which can be formed by deposition from a vapor phase reaction. Conditions for forming platelets and large single crystals are sufficiently distinctive to provide a basis for process control in accordance with the principles of the invention. A distinct advantage is that the invention includes a choice of two operating modes, one using the optical growth monitoring system to facilitate manual control and the other using it to provide directive signals to servo controller 68. Both modes are considered to be within the scope of the invention. Another distinct advantage is that the invention provides a means for determining and controlling the concentration of nuclei delivered to the reaction zone.

It is to be understood that the system is not limited to infrared light and, particularly in the case of materials other than alumina, light of other wavelengths may be

We claim:

1. Method of growing $Al_2O_3$ whiskers in a reaction chamber by deposition from the vapor phase according to the reaction

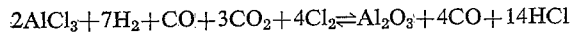

comprising the steps of feeding $AlCl_3$, $Cl_2$, $H_2$, $CO_2$, and CO to the reaction chamber at selected rates corresponding to the stoichiometry of said reaction, sensing the degree of scattering of light of a first predetermined wavelength by particles of $Al_2O_3$ in said vapor phase, sensing the degree of scattering of light of a second predetermined wavelength by particles of $Al_2O_3$ in said vapor phase, and controlling the reaction by adjusting the rate of flow of at least one of said gases in accordance with the degree of scattering of light at said first wavelength relative the degree of scattering of light at said second wavelength.

2. Method of claim 1 wherein the reaction is controlled by adjusting the flow of one of the following gases: $H_2$, $CO_2$ and CO.

3. Method of claim 1 wherein said first and second predetermined wavelengths fall within the infrared region.

4. Method of claim 1 wherein one of said wavelengths is within the range of 1.2–1.3 microns.

5. Method of claim 1 wherein the reaction is controlled by adjusting the rate of flow of at least one of said gases so that there is a minimum difference between the degree of scattering of light at said first wavelength and the degree of scattering of light at said second wavelength.

6. A method of growing $Al_2O_3$ whiskers in a heated reaction chamber by deposition from a supersaturated vapor phase according to a selected vapor phase reaction involving $AlCl_3$, $Cl_2$, $H_2$, CO, and $CO_2$ gases, comprising the steps of feeding said gases to the reaction chamber at rates sufficient for said selected reaction to occur and for said vapor phase to become supersaturated, sensing the spectral scattering of light of selected wavelengths by particles of $Al_2O_3$ in said vapor phase, and controlling the degree of supersaturation of said vapor phase by varying the flow of at least one of said gases in accordance with the degree of scattering of said light of selected wavelengths.

7. Method of growing $Al_2O_3$ whiskers in a heated reaction chamber by deposition from a supersaturated vapor phase according to a selected vapor phase reaction involving $AlCl_3$, $Cl_2$, $H_2$, CO and $CO_2$ gases, comprising the steps of feeding selected ones of said gases to the reaction chamber at rates sufficient for said reaction to occur, monitoring the spectral scattering of infrared light by particles of $Al_2O_3$ in said vapor phase, and adjusting the rate of feeding of at least one of said gases to achieve a scattering effect characteristic of growth of $Al_2O_3$ whiskers.

8. Method of claim 7 wherein the monitored light is within a wavelength band of 1 to 3 microns.

9. Method of growing alumina whiskers in a heated reaction chamber by deposition from a vapor phase according to a selected vapor phase reaction essentially involving aluminum chloride, hydrogen, chlorine, carbon monoxide and carbon dioxide gases as reactants, comprising the steps of initiating said selected reaction by feeding said gases to said reaction chamber, sensing the spectral scattering of infrared light by particles of $Al_2O_2$ in said chamber, and controlling the reaction rate by varying the relative concentrations of said gases in said chamber so as to maintain the degree of scattering of selected wavelengths within predetermined limits characteristic of growth of alumina whiskers.

10. Method of growing alumina whiskers in a reaction chamber by deposition from the vapor phase according to a selected vapor phase reaction involving aluminum chloride, chlorine, hydrogen, carbon monoxide, and carbon dioxide gases, comprising the steps of feeding said gases to the reaction chamber at selected rates sufficient for said selected reaction to occur and for said vapor phase to become supersaturated, sensing the degree of scattering of infrared light of a first predetermined wavelength by particles of aluminum oxide in said vapor phase, sensing the degree of scattering of infrared light of a second predetermined wavelength by particles of aluminum oxide in said vapor phase, and controlling the reaction by adjusting the relative rates of flow of said gases into said reaction chamber in accordance with the difference between the degree of scattering of infrared light at said first wavelength and the degree of scattering of infrared light at said second wavelength.

11. Method of claim 10 wherein the reaction is controlled by varying the rates of flow of chlorine, carbon monoxide and carbon dioxide.

References Cited

UNITED STATES PATENTS

| 2,269,674 | 1/1942 | Liddel et al. | |
| 3,068,113 | 12/1962 | Strain et al. | 106—300 |
| 3,094,385 | 6/1963 | Brisbin et al. | 23—142 |
| 3,148,027 | 9/1964 | Richmond | 23—142 X |
| 3,330,960 | 7/1967 | Rich. | |
| 2,316,239 | 4/1943 | Hare. | |
| 2,694,335 | 11/1954 | Albright et al. | 250—43.5 X |
| 2,816,479 | 12/1957 | Sloan | 250—218 X |
| 3,296,446 | 1/1967 | Heller | 250—218 |
| 3,365,316 | 1/1968 | Kingery et al. | 23—142 X |

OSCAR R. VERTIZ, Primary Examiner.

G. T. OZAKI, Assistant Examiner.

U.S. Cl. X.R.

23—1, 182, 191, 209, 273; 250—45, 218